United States Patent
Dai et al.

(10) Patent No.: US 9,118,494 B2
(45) Date of Patent: Aug. 25, 2015

(54) METHOD FOR GROUP-BASED MULTICAST WITH NON-UNIFORM RECEIVERS

(75) Inventors: Weiqian Dai, San Jose, CA (US); Ming Li, Cupertino, CA (US); Renwei Li, Fremont, CA (US); Xuesong Dong, Pleasanton, CA (US); Yang Yu, San Ramon, CA (US); Randall Stewart, Chapin, SC (US)

(73) Assignee: Futurewei Technologies, Inc., Plano, TX (US)

(*) Notice: Subject to any disclaimer, the term of this patent is extended or adjusted under 35 U.S.C. 154(b) by 436 days.

(21) Appl. No.: 12/985,832

(22) Filed: Jan. 6, 2011

(65) Prior Publication Data
US 2012/0177038 A1  Jul. 12, 2012

(51) Int. Cl.
*H04L 12/18* (2006.01)

(52) U.S. Cl.
CPC ............ *H04L 12/184* (2013.01); *H04L 12/185* (2013.01); *H04L 12/1868* (2013.01); *H04L 12/1881* (2013.01); *H04L 12/1877* (2013.01)

(58) Field of Classification Search
None
See application file for complete search history.

(56) References Cited

U.S. PATENT DOCUMENTS

| | | | | |
|---|---|---|---|---|
| 5,905,871 A * | 5/1999 | Buskens et al. | | 709/245 |
| 5,940,391 A * | 8/1999 | Malkin et al. | | 370/390 |
| 6,269,085 B1 * | 7/2001 | Provino et al. | | 370/256 |
| 6,507,562 B1 * | 1/2003 | Kadansky et al. | | 370/216 |
| 6,563,822 B1 * | 5/2003 | Aoki | | 370/390 |
| 6,693,907 B1 * | 2/2004 | Wesley et al. | | 370/390 |
| 7,009,971 B2 | 3/2006 | Novaes | | |
| 7,532,622 B2 * | 5/2009 | Pung et al. | | 370/390 |
| 2002/0138551 A1 * | 9/2002 | Erickson | | 709/203 |
| 2003/0152107 A1 | 8/2003 | Pekonen | | |
| 2006/0029092 A1 * | 2/2006 | Luo et al. | | 370/432 |
| 2007/0076714 A1 * | 4/2007 | Ananthakrishnan et al. | | 370/390 |
| 2007/0086366 A1 * | 4/2007 | Luo et al. | | 370/260 |

(Continued)

FOREIGN PATENT DOCUMENTS

| CN | 101427512 A | 5/2009 |
|---|---|---|
| CN | 101569147 A | 10/2009 |

(Continued)

OTHER PUBLICATIONS

Cheung, S., et al., "On the Use of Destination Set Grouping to Improve Fairness in Multicast Video Distribution," Infocom 1996, Fifteenth Annual Joint Conference of the IEEE Computer Societies, Networking the Next Generation, XPI 0158115, Mar. 24, 1996, pp. 553-559.*

(Continued)

*Primary Examiner* — Timothy J Weidner
(74) *Attorney, Agent, or Firm* — Conley Rose, P.C.; Grant Rodolph; Brandt D. Howell

(57) ABSTRACT

An apparatus comprising a proxy configured to couple to a sender and a receiver and to receive data from the sender at a first rate and forward the data to the receiver at a second rate that is less than the first rate. A method comprising detecting a reception speed for each of a plurality of receivers in a multicast group, assigning the receivers to a first group and a second group based on the reception speed of each of the receivers, wherein the first group has a reception speed that is faster than a reception speed of the second group, and sending multicast data intended for all of the receivers to the receivers in the first group and to a proxy at a first rate, wherein the proxy buffers the multicast data and sends the multicast data to the receivers in the second group at a second rate.

12 Claims, 4 Drawing Sheets

(56) References Cited

U.S. PATENT DOCUMENTS

| | | | |
|---|---|---|---|
| 2007/0121664 A1* | 5/2007 | Szczebak et al. | 370/449 |
| 2007/0226577 A1* | 9/2007 | Lee | 714/751 |
| 2007/0233889 A1* | 10/2007 | Guo et al. | 709/231 |
| 2008/0056255 A1* | 3/2008 | Birman et al. | 370/390 |
| 2008/0075124 A1* | 3/2008 | Fourcand | 370/503 |
| 2008/0181114 A1 | 7/2008 | Fourcand | |
| 2008/0198848 A1* | 8/2008 | Yamagishi | 370/390 |
| 2009/0052449 A1* | 2/2009 | Ramakrishnan et al. | 370/390 |
| 2009/0089848 A1* | 4/2009 | Satou | 725/109 |
| 2009/0213867 A1* | 8/2009 | Devireddy et al. | 370/419 |
| 2009/0238183 A1* | 9/2009 | Wu | 370/390 |
| 2009/0304019 A1* | 12/2009 | Chan | 370/432 |
| 2009/0327918 A1* | 12/2009 | Aaron et al. | 715/751 |
| 2012/0117438 A1* | 5/2012 | Shaffer et al. | 714/749 |
| 2012/0127994 A1* | 5/2012 | Ko et al. | 370/390 |

FOREIGN PATENT DOCUMENTS

| | | |
|---|---|---|
| CN | 101924910 A | 12/2010 |
| EP | 1986359 A1 | 10/2008 |

OTHER PUBLICATIONS

Foreign Communication From a Related Counterpart Application, PCT Application No. PCT/CN2011/073907, International Search Report dated Oct. 13, 2011, 3 pages.

Foreign Communication From a Related Counterpart Application, PCT Application No. PCT/CN2011/073907, Written Opinion dated Oct. 13, 2011, 7 pages.

Chawathe, Y., et al., "RMX: Reliable Multicast for Heterogeneous Networks," Infocom 2000, Nineteenth Annual Joint Congerence of the IEEE Computer and Communications Societies, XP010376169, vol. 2, Israel, Mar. 26-30, 2000, pp. 795-804.

Cheung, S., et al., "On the Use of Destination Set Grouping to Improve Fairness in Multicase Video Distribution," Infocom 1996, Fifteenth Annual Joint Conference of the IEEE Computer Societies, Networking th eNext Generation, XP10158115, Mar. 24, 1996, pp. 553-559.

Liu, J., et al., "A Proxy-Assisted Adaptation Framework for Object Video Multicasting," IEEE Transactions on Circuits and Systems for Video Technology, IEEE Service Center, Piscataway, NJ, vol. 15, No. 3, XP011127215, Mar. 1, 2005, pp. 402-411.

Wittmann, R., et al., "AMnet: Active Multicasting Network," Conference Record. 1998 IEEE International Conference on Communications, vol. 2, XP010284776, Jun. 7-11, 1998, pp. 896-900.

Foreign Communication From a Counterpart Application, Chinese Application No. 201180063649.2, Chinese Office Action dated May 5, 2015, 6 pages.

Foreign Communication From a Counterpart Application, Chinese Application No. 201180063649.2, Chinese Search Report dated Apr. 24, 2015, 2 pages.

* cited by examiner

METHOD FOR GROUP-BASED MULTICAST WITH NON-UNIFORM RECEIVERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multicasting is a scheme for one-to-many communications over a network, such as an Internet Protocol (IP) network. Multicast uses network infrastructure efficiently by requiring the source to send a packet only once, even if the packet is delivered to a plurality of receivers. Some nodes in the network can replicate the packet to reach multiple receivers when necessary. The multicast scheme scales to a larger receiver population without requiring prior knowledge of which or how many receivers are present in the network. Examples of multicast communications at the Open Systems Interconnection (OSI) Data Link Layer, include Ethernet multicast addressing, Asynchronous Transfer Mode (ATM) point-to-multipoint (P2MP) virtual circuits, and Infiniband multicast.

In some networks, multicast is the delivery of a message or information to a group of destinations at about the same time. The message can be delivered in a single transmission from the source by creating copies automatically in other network elements, such as routers, according to the topology of the network. Multicast is commonly implemented in IP networks, for example in IP applications of streaming media and Internet television. In IP multicast the implementation of the multicast concept occurs at the IP routing level, where routers create suitable distribution paths for datagrams that are sent to a multicast destination address. IP multicast is widely deployed in enterprises, commercial stock exchanges, and multimedia content delivery networks. One enterprise use of IP multicast is for IP Television (IPTV) applications.

SUMMARY

In one embodiment, the disclosure includes an apparatus comprising a proxy configured to couple to a sender and a receiver and to receive data from the sender at a first rate and forward the data to the receiver at a second rate that is less than the first rate.

In another embodiment, the disclosure includes a network component comprising a transmitter unit configured to transmit multicast data to a plurality of first receivers in a first group and to a proxy associated with a second receiver in a second group, a circuit logic configured to determine a slower receiver of the first receivers based on a detected reception speed for each of the first receivers, wherein the transmitter unit is further configured to send a first message to the slower receiver and the proxy indicating that the slower receiver is to join the second group, and a receiver unit configured to receive a second message from the proxy indicating that a faster receiver in the second group is to be moved to the first group.

In yet another embodiment, the disclosure includes a method comprising detecting a reception speed for each of a plurality of receivers in a multicast group, assigning the receivers to a first group and a second group based on the reception speed of each of the receivers, wherein the first group has a reception speed that is faster than a reception speed of the second group, and sending multicast data intended for all of the receivers to the receivers in the first group and to a proxy at a first rate, wherein the proxy buffers the multicast data and sends the multicast data to the receivers in the second group at a second rate.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a multicast router environment, different nodes, such as receivers or line cards, may receive the same data from a router at different rates or speed, for example due to different bandwidth capabilities, link capacities, buffer capabilities, and/or bottlenecks. For example, some receivers may be relatively slow due to old or legacy hardware components, slower line cards, slower central processor unit (CPU) speed, smaller receiver queue, or combinations thereof. Thus, the router may need to adjust the data transmission speed to meet the data rate capabilities of the slowest receivers, for example in cases where the router has to periodically wait for acknowledgements from all of the receivers and/or the router cannot multicast the data at a rate higher than the slowest receiver can receive. Doing so may reduce network performance, impact user experience, and/or may not meet user requirements.

Disclosed herein is a system and method for multicasting data to a plurality of receivers on a group basis based on the data rates or speed capabilities of the receivers. The system may comprise a sender (e.g. a router) coupled to a first group of receivers and a proxy that may or may not be a member of the first group of receivers. The proxy may also be coupled to a second group of receivers that may receive and/or handle data at a slower rate or speed than the first group of receivers. The sender may send multicast data to the receivers in the first group and the proxy at about a first rate, which may be properly handled by the receivers in the first group and the proxy, but which would be too fast for the receivers in the second group. The proxy may forward the data from the sender to the receivers in the second group at a second rate that may be slower than the first rate and properly handled by the receivers in the second group. Additionally, if the data rate or speed capability of a receiver in the first group decreases, the receiver may be removed from the first group and assigned to the second group of receivers, and hence the reassigned receiver may receive data via the proxy at the second rate. Similarly, if the data rate or speed capability of a receiver in the second group increases, the receiver may be moved from the second group of receivers to the first group of receivers, and hence may receive data from the sender at the first rate.

Figure 1:
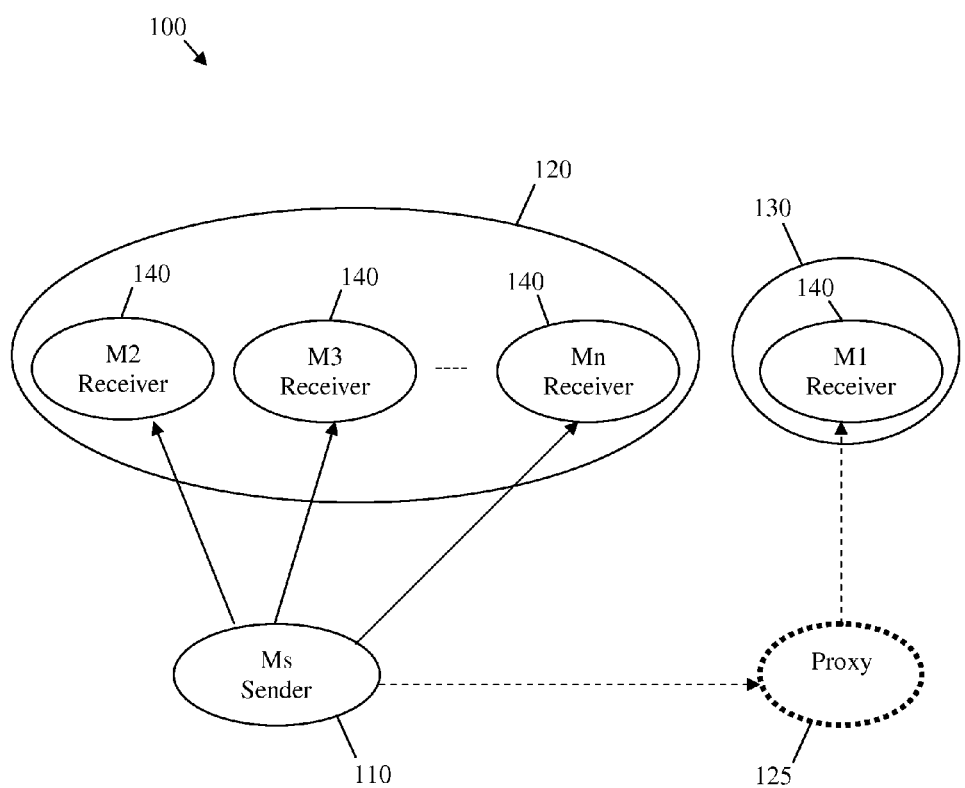
FIG. 1 is a schematic diagram of an embodiment of a group-based multicast architecture.

FIG. 1 illustrates one embodiment of a group-based multicast architecture 100. The group-based multicast architecture 100 may comprise a sender 110 (labeled Ms), a first group 120 of receivers, a proxy 125, and a second group 130 of receivers. The first group 120, the second group 130, or both may comprise one or more receivers 140. The components of the group-based multicast architecture 100 may be arranged as shown in FIG. 1. For instance, the first group 120 may comprise a plurality of receives 140 (labeled M2, M3 . . . Mn, where n is an integer), which may be coupled to the sender 110. The second group 130 may comprise an additional receiver 140 (labeled M1), which may be coupled to the sender 110 via the proxy 125. In other embodiments, the second group 130 may comprise more than one receiver 140 or may be empty. The first group 120 and the second group 130 may be logical groups to which the receivers 140 may be logically assigned, regardless of the physical or geographical location of the receivers 140.

The group-based multicast architecture 100 may correspond to any communications network that supports multicast communications, such as Ethernet based networks, IP based networks, passive optical networks (PONs), digital subscriber line (DSL) networks, Synchronous Optical Networking (SONET)/Synchronous Digital Hierarchy (SDH) networks, wireless networks, other communications networks, or combinations thereof. In some embodiments, the group-based multicast architecture 100 may correspond to an enterprise network, a backbone network, or an access network, which may have different topologies. In one embodiment, the group-based multicast architecture 100 may correspond to a computer network where a multicast router may be coupled to a plurality of network or line cards.

In one embodiment that corresponds to a multicast router environment, the sender 110 may be a route processor, the proxy 125 may be a proxy, and the receivers 140 may comprise line cards or network interface cards (NICs). In an embodiment that corresponds to a PON, the sender 110 may be an optical network terminal (OLT) or an OLT component and the receivers 140 may correspond to a plurality of optical network terminal (ONTs). In another embodiment that corresponds to a DSL network, the sender 110 may be a very high bit rate DSL (VDSL) transceiver unit at a central office (VTU-O) or a VTU-O component and the receivers 140 may correspond to a plurality of VDSL transceiver units at residential locations (VTU-Rs).

The sender 110 may be any network node, component, or device that transmits data, such as multicast data, to the receivers 140 in the first group 120 and the proxy 125, e.g. at about the same rate. For instance, the sender 110 may send a plurality of copies of the same data to the receivers 140 in the first group 120 and to the proxy 125, which may or may not be logically assigned to the first group 120. The sender 110 may generate and transmit the data or may receive and forward the data from another node (not shown), e.g. a source node, in the same or other network. For instance, the sender 110 may be a bridge, a router, or a switch that multicast data in the network. The data may comprise packets (e.g. IP packet), frames (e.g. Ethernet frames), datagrams, messages, signals, or combinations thereof.

The receivers 140 may be any network nodes, components, or devices that receive multicast data from the sender 110 directly, such as in the first group 120, or via the proxy 125, such as in the second group 130. The receivers 140 may also be network nodes that forward or transmit data in the network or to another network, such as bridges, routers, and/or switches. Alternatively, the receivers 140 may be customer equipment that delivers data to end users. For example, the receivers 140 may comprise home-based communications equipment, such as a set-top box, fixed personal devices, such as a desktop computer, and/or mobile personal devices, such as a cellular phone, a laptop computer, or a portable computer pad.

The proxy 125 may be any network node, component, or device that receives multicast data from the sender 110 at a first rate and forwards the multicast data to each receiver 140 in the second group 130 at a second rate, which may be lower than the first rate. The proxy 125 may comprise a storage or buffer, which may be used to store or buffer the incoming data from the sender 110 at the first rate. The proxy 125 may store incoming data from the sender and forward, e.g. at about the same time, previously received and stored data to each receiver 140 in the second group 120 at the second rate. Thus, the proxy 125 may be a proxy router that handles multicasting data from the sender 110 to the receiver(s) 140 in the second group 130 at a reduced rate in comparison to the receivers 140 in the first group 120. The proxy 125 may be a bridge, a router, a switch, or a server and may be configured similar to or may be part of the sender 110.

The receivers 140 in the first group 120 may be configured to or capable of receiving/processing the same data from the sender 110 at about the first rate. The first rate may match the reception and/or processing speed capabilities, the bandwidth capabilities, and/or the link capacities of the receivers 140 in the first group 120. For example, the first rate may be on the order of Gigabits per second (Gbps), such as about 2.5 Gbps or about 10 Gbps. However, the receivers 140 in the second group 130 may be slower receivers that are configured to or capable of receiving/processing the data at slower speeds than the receivers 140 in the first group 120, e.g. at about the second rate. For example, the second rate may be on the order of Megabits per second (Mbps), such as about 100 Mbps, about 500 Mbps, or may be equal to about one Gbps. The slower speeds of the receivers 140 in the second group 130 may be due to slower reception and/or processing speed capabilities, smaller bandwidth capabilities or the link capacities, and/or bottlenecks in the network.

Separating the faster receivers 140 from the slower receivers 140 into the first group 120 and the second group 130, respectively, and using the proxy 125 may allow the sender 110 to send the multicast data, e.g. continuously, without reducing the data rate to match the transmission speeds of the slower receivers 140 or waiting for the slower receivers 140 to handle the incoming data. As such, the group-based multicast architecture 100 may improve network performance, improve user experience, and/or meet different user requirements. The group-based multicast architecture 100 may also resolve the issue of using legacy components, such as line cards, that have slower performance than more advance components in the same network without substantially reducing networking efficiency. Using legacy components and advanced components in the same network efficiently may reduce network cost since there may not be a need to replace the legacy components with more advanced and higher cost components.

In an embodiment, the components of the group-based multicast architecture 100 may be arranged in a tree topology, where the receivers 140 may also act as senders that multicast data to a plurality of second receivers (not shown), which may also be assigned or grouped in a plurality of groups for different transmission rates. In other embodiments, the receivers 140 may be grouped into more than two groups of different transmission speeds to address the different rate or speed capabilities of the receivers 140 as necessary. For example, the receivers 140 may be grouped into the first group 120 for the first rate, the second group 130 for the reduced second rate, and at least one third group for a third rate that is lower than both the first rate and the second rate. As such, the group-based multicast architecture 100 may comprise a proxy for the second and third groups or comprise additional proxies, e.g. up to one for each group other than the fastest group. For example, a third proxy may receive the data from the sender 110 at about the first rate and forward the data to the receivers 140 in the corresponding additional group at the corresponding rate, e.g. a third rate, that is lower than the first rate.

The sender 110 may monitor the speed or the receiving status of the receivers 140, e.g. continuously over time, and assign the receivers 140 accordingly to the first group 120 or the second group 130. For example, the sender 110 may assign the receivers 140 (e.g. M2, M3 . . . Mn) that have a speed capability above a threshold or at about the first rate to the first group 120 and assign the receivers 140 (e.g. M1) that have a speed capability below the threshold or at about the second rate to the second group 130. The sender 110 may also reassign some receivers 140 from the first group 120 to the second group 130 if the corresponding speed is reduced, for example below the threshold. Similarly, the sender 110 may reassign some receivers 140 from the second group 130 to the second group 120 if the corresponding speed is increased, for example above the threshold. As such, the receivers 140 may be assigned to the different groups in a dynamic manner based on the speed capabilities of the receivers, which may change over time.

The sender 110 may monitor the speeds of the receivers 140, e.g. over time, by sending a plurality of requests to the receivers 140, receiving corresponding reply messages from the receivers 140, and determining the time delays between the request and reply messages for each receiver 140. Alternatively, the sender 110 may request and/or receive speed parameters from the receivers 140. In some embodiments, the sender 110 may group the receivers 140 based on a plurality of policies, e.g. in addition to the speed capabilities of the receivers 140. The policies may be based on application requirements, including the reception time window size of the receiver, the receiver's CPU utilization, the receiver's memory resources, network congestions, traffic patterns on the network, or combinations thereof.

Initially, the sender 110 may send the data to a plurality of receivers 140 at about the first rate. The sender 110 may keep track of all the receivers 140 that receive the data at the first rate, which may be by default logically assigned to the first group 120. For instance, the sender 110 may maintain a member group state associated with the first group 120 that comprises the receivers 140. The member group state may include a list of all the receivers 140 assigned to the first group 120. When the sender 110 determines that a receiver 140 (e.g. M1) is a relatively slow receiver, the sender 110 may send a message to the proxy 125 to indicate that the slower receiver 140 is being assigned to the second group 130. The sender 110 may also send a message to the slower receiver 140 to inform the receiver 140 to begin receiving the data from the proxy 125 at a slower second rate instead of the sender 110. The sender 110 may also assign the proxy 125 to the first group 120 and/or send a copy of the same data to the proxy 125 at about the first rate. The sender 110 may only monitor or track the receiving status of the receivers 140 in the member status group associated with the first group. In some embodiments, the sender 110 may concurrently assign a plurality of slower receivers 140 to the second group 130 and indicate the transfer of the slower receivers 140 to the second group 130 to the proxy 125.

When the proxy 125 receives the message that indicates the slower receiver 140, the proxy 125 may send an acknowledgement message to the sender 110. In an embodiment, the sender 110 cannot send all of the data without intermittent acknowledgements from the receivers, and the proxy 125 provides the acknowledgement on behalf of the slower receiver 140. Thus, the sender 110 may remove the slower receiver 140 from the member group state associated with the first group 120. The proxy 125 may then begin managing or keeping track of the slower receiver 140. For instance, the proxy 125 may maintain a member state group associated with the second group 130 that comprises the slower receiver 140. The member group state may include a list of all the slower receivers 140 assigned to the second group 130. The proxy 125 may receive and buffer the data at about the first rate and forward the buffered data to the slower receiver 140 at about the second rate. Similarly, the proxy 125 may keep track of and forward the buffered data to any additional receiver 140 that may also be assigned to the second group 130 and maintained in the corresponding member state group. The proxy 125 may also monitor the speeds of each receiver 140 in the second group 130, e.g. over time. When the proxy 125 determines that the speed capability of a receiver 140 (e.g. M1) in the second group 130 has increased, for example due to changing network conditions, the proxy 125 may send a message to the sender 110 to indicate that the receiver 140 is no longer a slower receiver and may begin receiving data at a higher rate, e.g. the first rate. Thus, the receiver 140 may be logically moved from the second group 130 to the first group 120. The proxy 125 or the sender 110 may also send a message to the receiver 140 to inform the receiver 140 to begin receiving the data from the sender 110 at the faster first rate instead of the proxy 125. In some embodiments, the proxy 125 may move at once a plurality of receivers 140 from the second group 130 to the first group 120 and indicate the receivers 140 to the sender 110.

Figure 2:
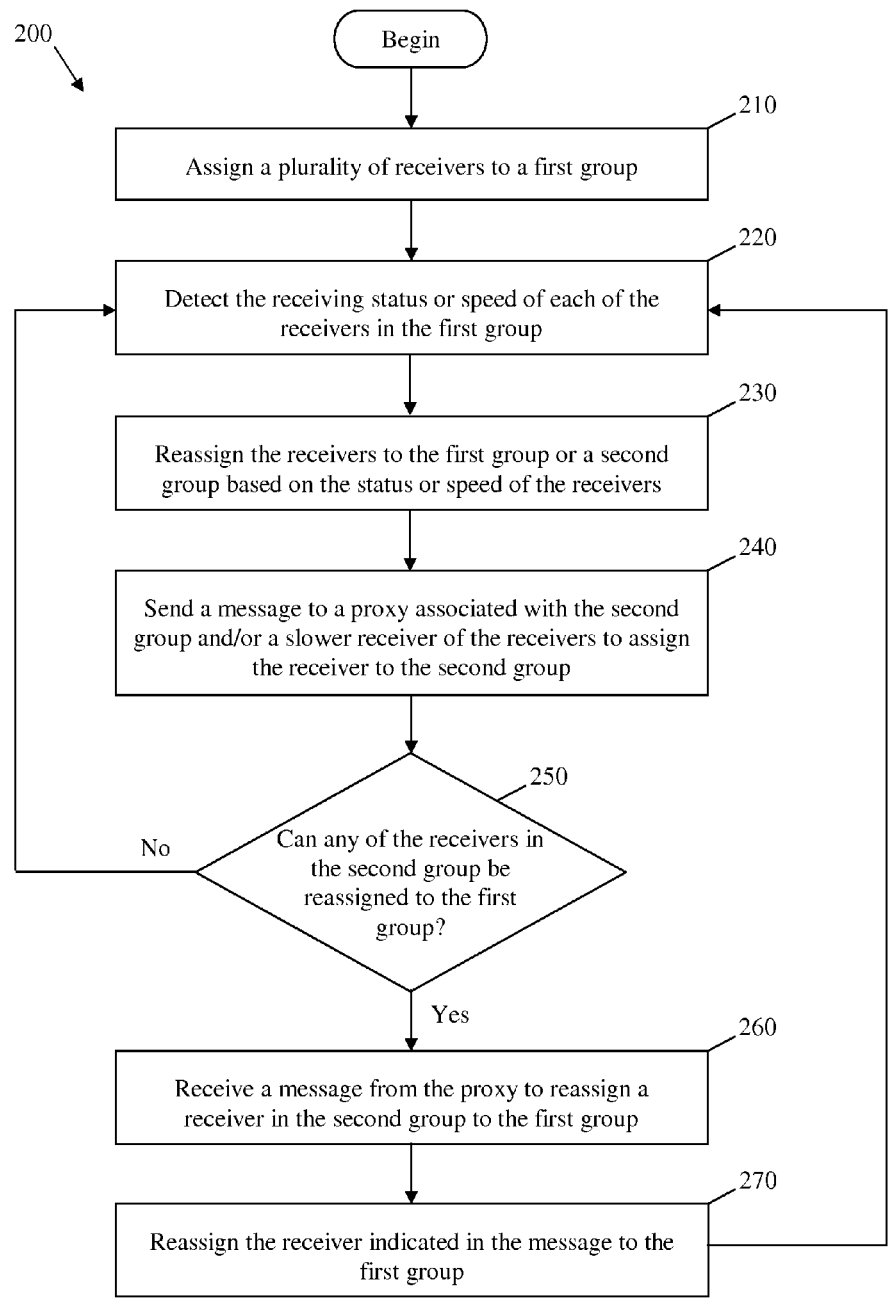
FIG. 2 is a flowchart of an embodiment of a group-based multicast method.

FIG. 2 illustrates an embodiment of a group-based multicast method 200, which may be used to group a plurality of multicast receivers in different groups based on their reception speed. For instance, the group-based multicast method 200 may be implemented by the sender 110 in coordination with the proxy 125 in a dynamic manner to handle transmissions to the receivers 140. At block 210, a plurality of receivers may be assigned to a first group. For example, the sender may assign by default all the receivers in a multicast group to a member group state for the first group. At block 220, the receiving status or speed of each of the receivers in the first group may be detected. For example, the sender may determine the status or speed of each receiver by receiving a plurality of messages from the corresponding receivers.

At block 230, the receivers may be reassigned to the first group or a second group based on the status or speed of the receivers. For instance, the sender may reassign each of the receivers either to the first group or the second group by comparing the speed of each receiver to a threshold or to a first rate and a lower second rate. A receiver may remain in the first group if the receiver's speed is above the threshold or equal to about the first rate. Alternatively, the receiver may be moved to the second if the receiver's speed is below the threshold or equal to about the second rate. At block 240, a message may be sent to a proxy associated with the second group and/or to the slower receiver(s) indicating that the slower receivers have been assigned to the second group. Specifically, the sender may send a message to the proxy to inform the proxy of the slower receiver(s) joining the second group. The sender may also send a message to each of the slower receivers to move the receivers to the second group.

At block 250, the method 200 may verify whether any of the receivers in the second group can be reassigned to the first group. For instance, the receiving speed of a receiver in the second group may increase above the threshold or may become equal to about the first rate. In this case, the receiver may not be a slower receiver anymore, and may regain membership within the first group. If the condition in block 250 is satisfied, the method 200 may proceed to block 260. Otherwise, the method 200 may return to block 220 to continue detecting the receiving status or speed of the receivers in the first group. At block 260, a message may be received from the proxy to reassign a receiver in the second group to the first group. The proxy may detect the receiving status or speed of the slower receivers in the second group and determine if any of the slower receivers may be reassigned to the first group based on the receiver's improved reception/processing speed. Thus, the proxy may send a message to the sender and the receiver to move the receiver from the second group to the first group. At block 270, the receiver indicated in the message may be reassigned to the first group. For example, the sender may add the receiver indicated in the message to the member group state for the first group. The method 200 may then return to block 220.

While the multicast technique described above is described in terms of remote multicast (e.g. inter-node multicasting), it will be appreciated that the same multicast technique can be applied to local multicasting (e.g. intra-node multicasting). In such cases, the sender, receivers, and proxy described above would by replaced by individual sender, receivers, and proxy components within a single node.

Figure 3:
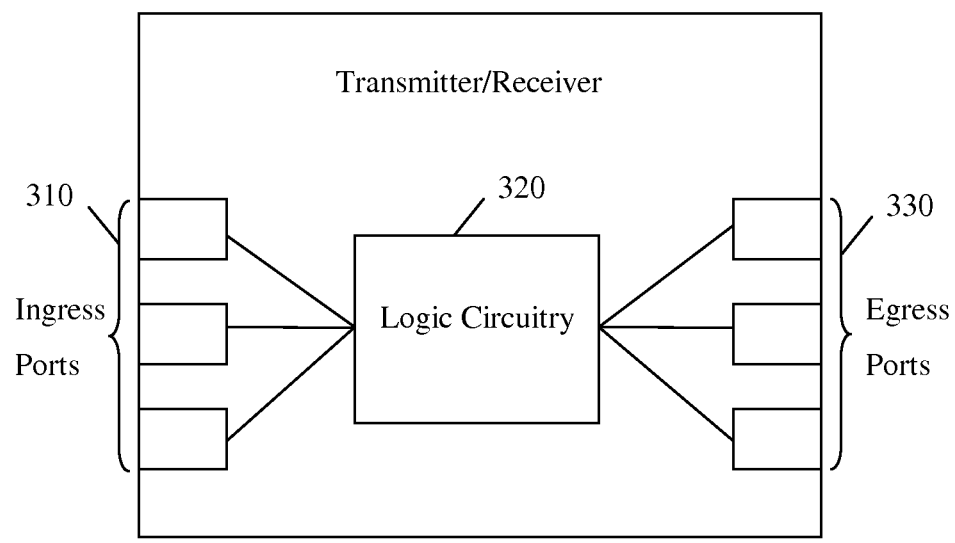
FIG. 3 is a schematic diagram of an embodiment of a transmitter/receiver unit.

FIG. 3 illustrates an embodiment of a transmitter/receiver unit 300, which may be located at or coupled to any of the components described above, e.g. in the group-based multicast architecture 100. The transmitter/receiver unit 300 may be any device that transports data through the network. For instance, the transmitter/receiver unit 300 may correspond to or may be located in the sender 110, the proxy 125, and/or any of the receivers 140. The transmitted/receiver unit 300 may comprise a plurality of ingress ports or units 310 for receiving frames, objects, or type-length-values (TLVs) from other nodes, logic circuitry 320 to determine which nodes to send the frames to, and a plurality of egress ports or units 330 for transmitting frames to the other nodes. The transmitter/receiver unit 300 may also comprise a buffer (not shown) between the ingress ports 310 and the logic circuit 320 and/or between the logic circuit 320 and the egress node 330.

Figure 4:
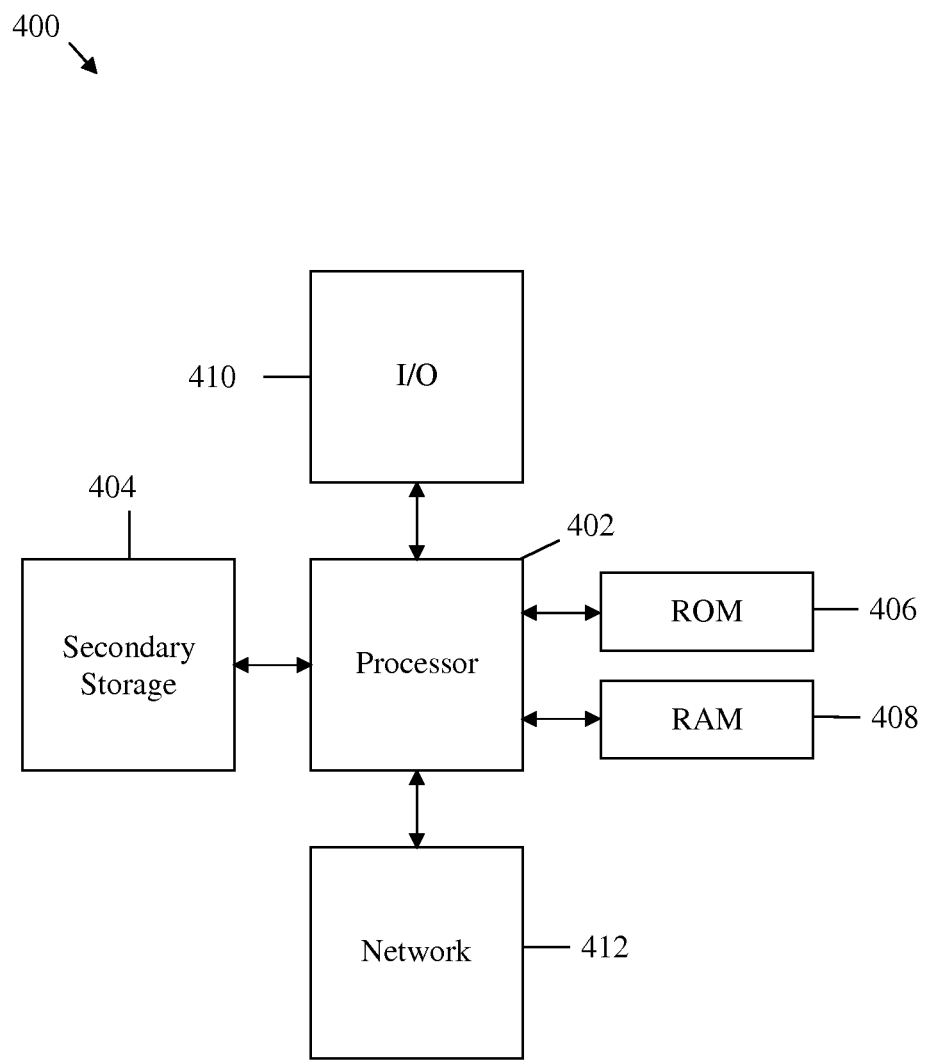
FIG. 4 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a proxy configured to:
      communicate with a multicast sender node that multicasts data to the proxy and to a first receiver group at a first rate;
      communicate with a second receiver group;
      receive a message indicating that a receiver node has been reassigned from the first receiver group to the second receiver group based on a speed capability of the receiver node falling below a first threshold;
      receive the multicast data from the sender node at the first rate;
      forward the multicast data to the receiver node in the second receiver group at a second rate that is less than the first rate, wherein multicast data forwarded to the second receiver group and data multicasted to the first receiver group is the same data;
      monitor the speed capability of the receiver node over time; and
      send a message to the sender node to reassign the receiver node to the first receiver group when the speed capability of the receiver node rises above a second threshold,
      wherein the sender node cannot continuously send the multicast data without intermittent acknowledgements from each multicast recipient, and
      wherein the proxy provides to the sender node an intermittent acknowledgement on behalf of the receiver node to support continued transmission of the multicast data regardless of late acknowledgements from the receiver node.

2. The apparatus of claim 1, further comprising a buffer configured to store the multicast data from the sender node to support forwarding the multicast data to the receiver node in the second receiver group.

3. The apparatus of claim 1, wherein the second receiver group is maintained by the proxy, and wherein the first receiver group is maintained by the sender node.

4. The apparatus of claim 1, wherein the first receiver group and the second receiver group comprise line cards, wherein the first receiver group comprises new line cards, and wherein the second receiver group comprises a legacy line card.

5. The apparatus of claim 1, wherein the receiver node would drop at least some of the data if the data was sent to the receiver node at the first rate while the receiver node is assigned to the second receiver group.

6. A system comprising:
   a proxy node configured to communicate with a first receiver group; and
   a sender node configured to communicate with a second receiver group, wherein the sender node is further configured to communicate with the first receiver group via the proxy node,
   wherein the proxy node is configured to:
      receive a message indicating that the sender node has assigned a receiver node to the first receiver group based on a speed capability of the receiver node falling below a first threshold;
      receive multicast data from the sender node at a first rate;
      forward the multicast data to the first receiver group at a second rate that is less than the first rate; and
      receive a message indicating that the sender has reassigned the receiver node from the first receiver group to the second receiver group based on the speed capability of the receiver node rising above a second threshold,
      wherein the sender node cannot continuously send the multicast data without intermittent acknowledgements from each multicast recipient, and
      wherein the proxy provides to the sender node an intermittent acknowledgement on behalf of the receiver node to support continued transmission of the multicast data regardless of late acknowledgements from the receiver node.

7. The system of claim 6, wherein the receiver node would drop at least some of the data if the data was sent to the receiver node at the first rate while the receiver node is assigned to the first receiver group.

8. The system of claim 7, wherein the first receiver group is maintained by the proxy, and wherein the second receiver group is maintained by the sender node.

9. The system of claim 8, wherein the proxy comprises a buffer configured to store the multicast data from the sender node to support forwarding the multicast data to the receiver node in the first receiver group.

10. The system of claim 9, wherein the first receiver group, the second receiver group, or both comprise routers that are coupled to a plurality of third receiver nodes, and wherein the third receiver nodes are grouped in a plurality of groups based on the third receiver nodes' reception capabilities.

11. The system of claim 9, wherein the first receiver group and the second receiver group comprise line cards, wherein the second receiver group comprises new line cards, and wherein the first receiver group comprises a legacy line card.

12. A method implemented in a proxy, the method comprising:
   communicating with a sender node that multicasts data to a first receiver group;
   communicating with a second receiver group;
   receiving a message indicating that the sender node has assigned a receiver node to the second receiver group based on a speed capability of the receiver node falling below a first threshold;
   receiving multicast data from the sender node at a first rate;
   forwarding the data to the receiver in the second receiver group at a second rate that is less than the first rate;

monitoring the speed capability of the receiver node over time; and sending a message to the sender node to reassign the receiver node to the first receiver group when the speed capability of the receiver node rises above a second threshold, wherein the sender node cannot continuously send the multicast data without intermittent acknowledgements from each multicast recipient, and wherein the proxy provides to the sender node an intermittent acknowledgement on behalf of the receiver node to support continued transmission of the multicast data regardless of late acknowledgements from the receiver node.

\* \* \* \* \*